United States Patent [19]

Hughes

[11] Patent Number: 4,789,512
[45] Date of Patent: Dec. 6, 1988

[54] METHOD OF ENCLOSING AN OBJECT WITHIN A HOMOGENEOUS BLOCK

[75] Inventor: John T. Hughes, Cromwell Crescent, United Kingdom

[73] Assignee: Micropore International Limited, Droitwich, United Kingdom

[21] Appl. No.: 41,432

[22] Filed: Apr. 15, 1987

[30] Foreign Application Priority Data

Apr. 16, 1986 [GB] United Kingdom ............... 8609323
Jun. 5, 1986 [GB] United Kingdom ............... 8613684

[51] Int. Cl.$^4$ ............................................. B29C 43/18
[52] U.S. Cl. ............................... 264/120; 264/250; 264/272.11; 264/272.15; 338/226; 338/238
[58] Field of Search ............... 264/129, 135, 251, 258, 264/272.11, 120, 255, 256, 272.15, 272.16, 248, 249, 272.18, 250; 338/226, 232, 238, 243

[56] References Cited

U.S. PATENT DOCUMENTS

| | | | |
|---|---|---|---|
| 2,267,954 | 12/1941 | Schumacher | 264/249 |
| 2,284,439 | 5/1942 | MacArthur et al. | 264/135 |
| 2,745,931 | 5/1956 | Heibel | 264/249 |
| 2,758,183 | 8/1956 | Canegallo | 264/251 |
| 3,221,089 | 11/1965 | Cotton | 264/272.18 |
| 3,389,017 | 6/1968 | Webb | 264/129 |
| 3,550,228 | 12/1970 | Asscher | 264/272.18 |
| 4,102,039 | 7/1978 | Henrickson et al. | 264/251 |
| 4,148,856 | 4/1979 | Gress et al. | 264/251 |
| 4,335,932 | 6/1982 | Herrmann, Jr. | 264/272.18 |

FOREIGN PATENT DOCUMENTS

932787  7/1986  United Kingdom .

*Primary Examiner*—Jay H. Woo
*Assistant Examiner*—C. Scott Bushey
*Attorney, Agent, or Firm*—Browdy and Neimark

[57] ABSTRACT

An object such as a fuse is enclosed within a homogeneous block of microporous thermal insulation material by a method which includes forming first and second blocks of insulation material having a relatively low density, arranging the object between co-operating faces of the blocks, and compacting the blocks around the object so as to cause the blocks to merge and to form a homogeneous block of microporous thermal insulation material having a relatively high density. The first and second blocks may be incorporated into first and second housings respectively, one of the housings being provided with a protruding tab and the other of the housings being provided with a corresponding slot.

9 Claims, 1 Drawing Sheet

METHOD OF ENCLOSING AN OBJECT WITHIN A HOMOGENEOUS BLOCK

FIELD OF THE INVENTION

The present invention relates to a method of enclosing an object within a homogeneous block of microporous thermal insulation material.

DESCRIPTION OF PRIOR ART

When a non-flexible thermal insulation material is required to completely surround an object such as an electrical or electronic component or electrical fuse wire, the normal procedure is to produce the insulation material in the shape of formed components designed to fit together with minimum heat loss at the interface between adjacent insulation components.

When an object to be thermally insulated requires a particularly high performance from the insulation material, care must be taken to ensure that the individual components of the surrounding insulating body are an extremely good fit with each other in order to eliminate as far as possible the passage of heat through the gap which inevitably exists between the individual components of the insulating body.

A good fit between the individual components is especially important when the insulation material is a microporous thermal insulation because even still air has a higher thermal conductivity than the insulation material so that even a small gap will act as a path for heat conduction as well as for infra-red radiation. Ideally all gaps and joints should be eliminated so that the object to be thermally insulated is totally enclosed within the insulation material. This can readily be achieved when the insulation material is a mouldable foam material or when it can otherwise be assumed that the object to be insulated will remain undisturbed within the insulation material.

Microporous thermal insulation is normally manufactured as a block material by first mixing together the constituents of the insulation material, for example a finely divided insulating powder, an infra-red opacifier and/or a reinforcing fiber, so as to form an intimate mixture. Subsequently, the intimate mixture is introduced into a die and is compacted by applying pressure to the mixture. The intimate mixture itself typically has a density of 25 to 100 $kgm^{-3}$ and the manufactured block typically has a density of 200 to 400 $kgm^{-3}$. In practice, during compaction the volume of the mixture is reduced typically to about ten per cent of its original volume.

Heretofore it has been considered impractical to locate an object to be insulated within a homogeneous block of microporous thermal insulation material. This is because the intimate mixture is too fluid to support an object at a predetermined position so that it is not possible, for example, to locate an object at a central point within the intimate mixture and subsequently to apply pressure so as to form the block around the object. It may be possible to provide an external support for the object so as to determine the initial position of the object, but we have found that the final position of the object within the block is still likely to be at a random position.

We have found that the handling characteristics of the intimate mixture can vary depending on the storage of the intimate mixture. If the intimate mixture is allowed to stand for only a few minutes it has a relatively low density, but if it is allowed to stand for several hours it has a relatively high density because air is slowly released from the mixture and settling takes place. Irrespective of whether the intimate mixture is allowed to stand for a short or a long time, the mixture is capable of being compacted to produce a satisfactory block of microporous thermal insulation material, but any means used to locate an object to be insulated within the intimate mixture so that the block can be formed around the object must be capable of adapting to different characteristics of the mixture if a large number of objects is required to be insulated in a substantially identical manner. Any such means of locating the object to be insulated within the intimate mixture will inevitably be complicated and eventually may lead to a short heat path through the insulation material.

The insulation of small electrical components, for example, has until now been achieved by manufacturing two or more pieces of the insulation material which are designed to fit as closely as possible around the electrical component. A housing is normally provided for the insulation material to give protection during handling of the insulated electrical component. Such an assembly can provide satisfactory thermal performance, but it is expensive to manufacture and some gaps and joints will be present in the insulation material.

OBJECT OF THE INVENTION

It is an object of the present invention to provide a method of enclosing an object such as an electrical component within a homogeneous block of microporous thermal insulation material so as to provide particularly low thermal conductivity in a cost effective manner.

SUMMARY OF THE INVENTION

According to the present invention there is provided a method of enclosing an object within a homogeneous block of microporous thermal insulation material, which method comprises the steps of:
   forming first and second blocks of microporous thermal insulation material, the first and second blocks having a relatively low density;
   arranging an object to be insulated between cooperating faces of the first and second blocks; and
   compacting the first and second blocks around the object so as to cause the first and second blocks to merge and to form a homogeneous block of microporous thermal insulation material having a relatively high density.

The mating faces of the first and second blocks may be roughèned so as to promote adhesion between the blocks.

The microporous material may comprise a finely divided powder such as silica, alumina, titania or zirconia and may include an infra-red opacifier and/or a reinforcing fibre.

The homogeneous block may be coated with a protective material.

Alternatively, the first and second blocks may be incorporated into first and second housings respectively, the blocks being compacted by compressing the housings towards each other. The first housing is preferably a close fit within the second housing. One of the housings may be provided with a protruding tab and the other of the housings may be provided with a corresponding slot, the tab extending into the slot when the housings are compressed together so as to maintain the housings in position.

The present invention is particularly useful in the manufacture of insulated fuse wire where it is desired to provide an insulated fuse which can be handled by automatic equipment allowing the fuse to be fitted, normally using soldering methods, into a circuit board.

The fuse consists typically of a piece of fuse wire attached to connecting wires at each end with the fuse wire being completely embedded within the microporous thermal insulation material and a housing is provided to enclose the insulation material so that the connecting wires emerge through the housing enabling them to be linked to the circuit board.

For a better understanding of the present invention and to show more clearly how it may be carried into effect reference will now be made, by way of example, to the accompanying drawings in which:

DESCRIPTION OF THE PREFERRED EMBODIMENT

Figure 1:
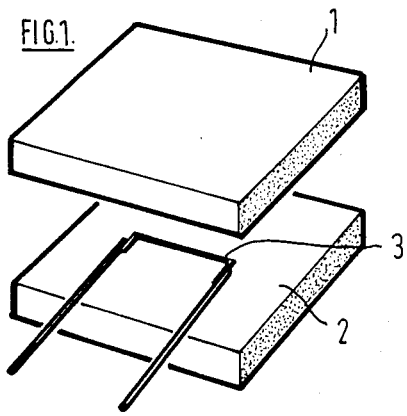
FIG. 1 shows the components of a homogeneous block prior to assembly by the method according to the present invention.

The components of a homogeneous block prior to assembly as shown in FIG. 1 comprise two blocks 1,2 of microporous thermal insulation material having a relatively low density and an object 3 to be insulated, which object is arranged between co-operating faces of the two blocks 1,2. The object 3 may be, for example, an electrical component such as a fuse.

Figure 2:
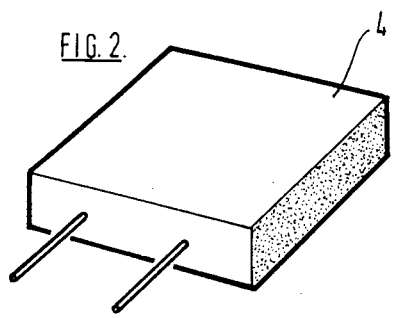
FIG. 2 shows the homogeneous block formed from the components shown in FIG. 1 by the method according to the present invention.

The components 1,2,3 are compressed together in the absence of any form of adhesive and surprisingly we have found that a single homogeneous block 4 can be formed as shown in FIG. 2. It would be expected that the two blocks 1,2 would not adhere to each other without an external adhesive or that at best they would bond lightly and would readily separate at the interface between the blocks. In practice, however, we have found it impossible to detect the interface between the two blocks.

Where the homogeneous block 4 is required to possess a relatively high mechanical strength, for example to allow for robust handling, the blocks 1,2 may have a density somewhat greater than would otherwise be employed and the mating faces are advantageously roughened to ensure good adhesion between the blocks 1,2.

The method according to the present invention is most readily applicable when the object to be enclosed is small or where there is a need for part of the object to protrude through the homogeneous block. In particular, the method according to the present invention is applicable to the insulation of electrical fuses where a fine fuse wire is welded to robust leads and the fuse wire is embedded in the insulation material with the leads protruding as illustrated in the figures.

The surface of the homogeneous block may be coated with a hard protective material such as resin or hard paint to produce an easily handled fully insulated object.

A separate housing may also be fitted around the homogeneous block, but it may be preferable to incorporate the first and second blocks in individual housings as described below.

Figure 3:
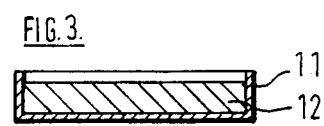
FIG. 3 is a cross-sectional view through an alternative component for use in forming a homogeneous block by the method according to the present invention.

The cross-sectional view shown in FIG. 3 is of one of two housing components in which a housing 11, typically manufactured from a rigid plastics material, contains a low density microporous thermal insulation material 12.

Figure 4:
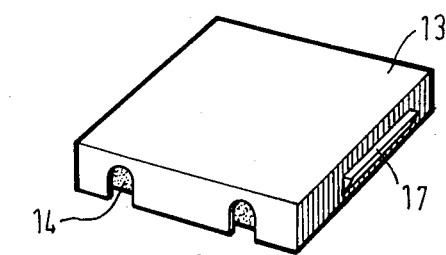
FIG. 4 is an exploded view of alternative components for use in forming a homogeneous block by the method according to the present invention.

The article shown in FIG. 4 comprises two housings 11,13 containing low density microporous thermal insulation material 12,14. One of the housings 13 is fitted with protruding tab 17 which engages in a slot 18 in the other of the housings 11 when the two housings are fitted together. Housing 13 is designed to be a close fit within housing 11 and both housings are sufficiently rigid to permit them to be compressed together without causing the housings to distort.

The housings are fitted together by applying pressure to their external faces with an object in the form of a fuse wire 15 located between the mating faces of the thermal insulation material 12,14. The thicknesses of the two layers of insulation material are arranged so that when the two housings are fitted together until the tab 17 engages with the slot 18, the insulation material is compacted and the fuse wire 15 is embedded in the insulation material so that the surface of the fuse wire is in intimate contact with the insulation material.

Figure 5:
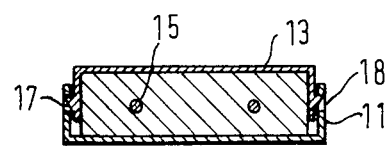
FIG. 5 is a cross-sectional view through an article incorporating a homogeneous block made by the method according to the present invention.

FIG. 5 shows that when the housings 11,13 are fully fitted together the tab 17 extends outwardly through the slot 18 and prevents the housings separating. Tab 17 may have an inclined face to aid insertion into the housing 11.

Figure 6:
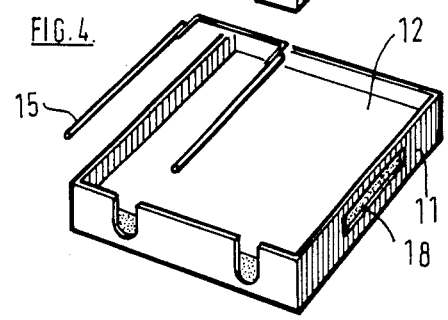
FIG. 6 is a perspective view of the article shown in FIG. 5.
Figure 6:
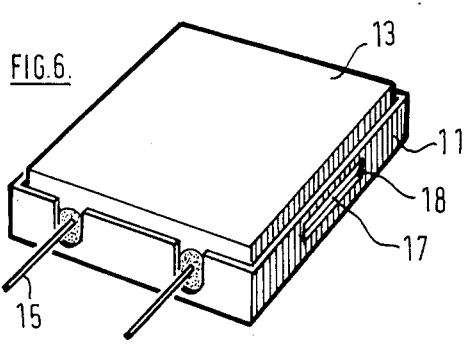

FIG. 6 shows a view of a completed fuse ready for incorporation into an electrical circuit.

The thermal insulation mixture used is that typically used for manufacturing microporous thermal insulation material and includes a finely divided powder and optionally an opacifier and/or a reinforcing fibre.

The finely divided powder may be finely divided metal oxide such as silica for example in the form of pyrogenic silica or silica aerogel, alumina, titania, zirconia or other powders which provide a microporous structure.

The opacifier may be a powder which is known to interfere with the transmission of infra-red energy waves such as titania for example in the form of rutile, iron oxide, ilmenite, other metal oxides and carbon. In some cases a reflecting opacifier may be preferred such as aluminium powder or flakes.

The density of the insulation material is not critical on performance grounds and choice of densities will be made by the skilled person dependent on costs and mechanical strength. We have found that for a fuse, a density in the range 150 to 200 $kgm^{-3}$ is most useful as the low density insulation material, although lower densities can be employed, particularly if the microporous insulation material consists of the finely divided powder per se.

The final density of the thermal insulation material also depends on the choice of the constituents of the insulation material, but the compaction must be adequate to ensure that the insulation material is formed around the object to be insulated.

In some of our tests, the thermal insulation mixture consisted of 60% by weight pyrogenic silica, 33% by weight rutile titania and 7% by weight ceramic fibre. The low density used was 190 kgm$^{-3}$ and the high density was 300 kgm$^{-3}$.

In one practical embodiment, the housings may have a nominal wall height of 5 mm and contain a 4 mm thick layer of insulation material at a density of 190 kgm$^{-3}$. The plan dimensions of the housings may be 10 mm × 10 mm. The final thickness of the article in the closed position may be 5 mm and the insulation material may be compacted to 300 kgm$^{-3}$. The fuse wire diameter may be 0.05 mm and the connector leads for the fuse wire may be 0.8 mm diameter.

As an alternative to using a tab and a slot for maintaining the housings in their fitted position, other methods such as gluing or welding can be employed.

Substantially dust-tight sealing of the insulation material within the housings can be achieved by further coating or partial coating of the housings using a sealing material. This may be particularly useful where the connectors protrude from the housing.

The low density insulation material may be installed within the housings by placing a housing into a jig and die so that the die is filled with loose insulation mixture which is then compacted using a punch tool within the die so that a low density block of insulation material is formed within the housing.

Alternatively, a low density sheet of insulation material may first be formed by compacting the loose insulation mixture within a die and extracting the sheet from the die. A punch tool is then used to punch a portion of the sheet of insulation directly into the housing using the housing as a cutting tool.

When the two housings are fitted together, the insulation material is compacted and merges to form a homogeneous block which contains stresses caused by the resilient nature of the bonding which takes place between adjacent finely divided particles so that, when the tab engages in the slot, the insulation material acts as a spring and so assists in providing a secure interconnection of the two housings.

I claim:

1. A method of enclosing an object within a homogeneous block of microporous thermal insulation material, which method comprises the steps of:
    forming independent first and second blocks of dry particulate microporous thermal insulation material, the first and second blocks having a first density;
    arranging an object to be insulated between cooperating faces of the first and second blocks; and
    compacting the first and second blocks around the object so as to cause the first and second blocks to merge and to form a homogeneous block of microporous thermal insulation material having a second density higher than said first density.

2. A method according to claim 1, wherein mating faces of the first and second blocks are roughened so as to promote adhesion between the blocks.

3. A method according to claim 1, wherein the microporous material comprises a finely divided powder selected rom the group consisting of silica, alumina, titania or zirconia.

4. A method according to claim 1, wherein the microporous material includes an infra-red opacifier.

5. A method according to claim 1, wherein the microporous material includes a reinforcing fiber.

6. A method according to claim 1 and including the step of coating the homogeneous block with a protective material.

7. A method according to claim 1, wherein said first and second blocks are incorporated with first and second housings respectively, the blocks being compacted by compressing the housings towards each other.

8. A method according to claim 7, wherein the first housing is a close fit within the second housing.

9. A method according to claim 8, wherein one of the housings is provided with a protruding tab and the other of the housings is provided with a corresponding slot, the tab extending into the slot when the housings are compressed together so as to maintain the housings in position.

* * * * *